(12) United States Patent
Kurian et al.

(10) Patent No.: US 11,120,432 B2
(45) Date of Patent: Sep. 14, 2021

(54) SECURITY TOOL FOR INFORMATION EXCHANGE

(71) Applicant: BANK OF AMERICA CORPORATION, Charlotte, NC (US)

(72) Inventors: Manu Jacob Kurian, Dallas, TX (US); Shiumui Lau Cheng, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/588,006

(22) Filed: Sep. 30, 2019

(65) Prior Publication Data

US 2021/0097534 A1     Apr. 1, 2021

(51) Int. Cl.
*G06Q 20/38*     (2012.01)
*G06Q 20/10*     (2012.01)

(52) U.S. Cl.
CPC ......... *G06Q 20/3821* (2013.01); *G06Q 20/10* (2013.01); *G06Q 20/383* (2013.01)

(58) Field of Classification Search
CPC ... G06Q 20/3821; G06Q 20/10; G06Q 20/383
See application file for complete search history.

(56) References Cited

U.S. PATENT DOCUMENTS

| | | |
|---|---|---|
| 6,076,078 A | 6/2000 | Camp |
| 6,185,545 B1 | 2/2001 | Resnick et al. |
| 7,313,544 B1 | 12/2007 | Bryman |
| 7,337,144 B1 | 2/2008 | Blinn et al. |
| 7,401,220 B2 | 7/2008 | Bolosky |
| 7,739,194 B2 | 6/2010 | Blinn et al. |
| 7,877,331 B2 | 1/2011 | Al-Herz |
| 7,885,878 B2 | 2/2011 | Newbrough |
| 7,966,238 B2 | 6/2011 | Bregstein et al. |

(Continued)

FOREIGN PATENT DOCUMENTS

EP     3248165 A1 * 11/2017     ......... G06Q 20/385

OTHER PUBLICATIONS

Liviu Hirtan et al. Blockchain-Based Approach fore-Health Data Access Management with Privacy Protection. Sep. 1, 2019, IEEE. (Year: 2019).*

*Primary Examiner* — Hani M Kazimi
*Assistant Examiner* — Alison L. Lamb
(74) *Attorney, Agent, or Firm* — Michael A. Springs

(57) ABSTRACT

A system includes a database, a memory, and a processor. The database stores an account that includes a first, second, and third subaccount. The memory stores a profile specifying a level of anonymization and a level of account access. The processor receives a request for a transaction. The request is associated with the profile. In response, the processor determines a set of subaccounts for the transaction including the first subaccount and the second subaccount. Determining the set of subaccounts for the first transaction includes determining that the profile permits access to the first, second, and third subaccounts, and that the transaction costs associated with the transaction are minimized by using the first and second subaccounts to perform the transaction. The processor additionally generates a virtual account from the set of subaccounts, anonymizes, based on the level of anonymization, the virtual account, and performs the transaction using the anonymized virtual account.

20 Claims, 4 Drawing Sheets

(56) References Cited

U.S. PATENT DOCUMENTS

| | | | |
|---|---|---|---|
| 8,121,943 | B2 | 2/2012 | Elterich |
| 8,156,047 | B1 | 4/2012 | Sanders |
| 8,160,966 | B2 | 4/2012 | Al-Herz et al. |
| 8,347,302 | B1 * | 1/2013 | Vincent ............... G06F 9/5011 718/104 |
| 8,352,378 | B2 | 1/2013 | Al-Herz et al. |
| 8,364,578 | B1 | 1/2013 | Honarvar |
| 8,396,798 | B2 | 3/2013 | Norman et al. |
| 8,401,965 | B2 | 3/2013 | Johnson et al. |
| 8,407,142 | B1 | 3/2013 | Griggs |
| 8,467,766 | B2 | 6/2013 | Rackley, III et al. |
| 8,498,934 | B2 | 7/2013 | Todd |
| 8,515,840 | B2 | 8/2013 | McCabe |
| 8,577,803 | B2 | 11/2013 | Chatterjee |
| 8,738,539 | B2 | 5/2014 | Al-Herz et al. |
| 8,768,835 | B2 | 7/2014 | Sanders |
| 9,141,977 | B2 | 9/2015 | Davis |
| 9,167,099 | B2 | 10/2015 | Davis |
| 9,171,324 | B2 | 10/2015 | Al-Herz et al. |
| 9,183,520 | B2 | 11/2015 | Davis |
| 9,195,848 | B2 | 11/2015 | Davis |
| 9,406,054 | B2 | 8/2016 | Al-Herz et al. |
| 9,757,644 | B2 | 9/2017 | Rose |
| 2002/0046341 | A1 | 4/2002 | Kazaks |
| 2002/0069122 | A1 | 6/2002 | Yun |
| 2003/0046223 | A1 | 3/2003 | Crawford |
| 2003/0145205 | A1 | 7/2003 | Sarcanin |
| 2005/0246292 | A1 | 11/2005 | Sarcanin |
| 2007/0087822 | A1 | 4/2007 | Van Luchene |
| 2007/0143853 | A1 | 6/2007 | Tsukamoto |
| 2008/0243703 | A1 | 10/2008 | Al-Herz et al. |
| 2009/0210347 | A1 | 8/2009 | Sarcanin |
| 2012/0221421 | A1 | 8/2012 | Hammad |
| 2013/0060694 | A1 * | 3/2013 | Oskolkov ............ G06Q 20/102 705/44 |
| 2013/0204894 | A1 | 8/2013 | Faith |
| 2014/0040127 | A1 | 2/2014 | Chatterjee |
| 2014/0052595 | A1 * | 2/2014 | Zimmer ............... G06Q 20/405 705/35 |
| 2015/0363770 | A1 | 12/2015 | Ronca |
| 2017/0262819 | A1 | 9/2017 | Malhotra et al. |

* cited by examiner

SECURITY TOOL FOR INFORMATION EXCHANGE

TECHNICAL FIELD

This invention relates generally to data security, and specifically to a security tool for information exchange.

BACKGROUND

Many techniques exist to help maintain information/data security within an organization. For example, sensitive data records are typically encrypted, and users generally undergo authentication procedures before being permitted access to internal data. However, such techniques may not be effective at providing information security when information is shared with external organizations (for example, during transactions and/or communications). In such situations, a certain amount of information is necessarily exported outside of the organization's internal security controls and made accessible to the external organizations. Such information may be intercepted by third parties for later improper use, or used in undesirable ways by the external organizations, themselves.

For example, if an external organization determines that a large well-known manufacturer is seeking to purchase certain products from the external organization, based on communications with the manufacturer, the organization may increase the price of those products, seeking to take advantage of the manufacturers available resources. Accordingly, the manufacturer may desire to keep its identity confidential during communications and/or transactions with the external organization.

SUMMARY

This disclosure contemplates a security tool that addresses one or more of the above technical problems. The tool receives transaction/communication requests from users seeking to perform transactions/communications between a first entity and a second entity. In response to receiving such requests, the tool generates anonymized virtual accounts to use to perform the transactions/communications, such that sensitive information that may be otherwise be transmitted along with the transactions/communications is obfuscated from the second entity. Certain embodiments of the tool are described below.

According to an embodiment, a system includes a database, a memory, and a hardware processor communicatively coupled to the memory. The database stores an account. The account includes a first subaccount, a second subaccount, and a third subaccount. The memory stores a first profile. The first profile specifies a first level of anonymization and a first level of account access. The first level of account access permits access to the first subaccount, the second subaccount, and the third subaccount. The first level of anonymization requests an anonymization of a first piece of identification information associated with the account. The hardware processor receives a request for a first transaction. The request is associated with the first profile. In response to receiving the request for the first transaction, the processor determines, based on the first transaction and the first profile, a set of subaccounts for the first transaction. The set of subaccounts for the first transaction includes the first subaccount and the second subaccount.

Determining the set of subaccounts for the first transaction includes determining that the first profile permits access to the first subaccount, the second subaccount, and the third subaccount. Determining the set of subaccounts for the first transaction also includes determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount. Here, the first transaction cost includes at least one of a foreign currency exchange fee, an excess withdrawal fee, and an interest charge. The processor additionally generates a virtual account including the set of subaccounts for the first transaction. The processor further anonymizes, based on the first level of anonymization, the virtual account. Anonymizing the virtual account includes applying the anonymization to the first piece of identification information. The processor also performs the first transaction using the anonymized virtual account.

According to another embodiment, a method includes receiving a request for a first transaction to be performed using an account. The request is associated with a first profile. The first profile specifies a first level of anonymization and a first level of account access. The first level of account access permits access to a first subaccount of the account, a second subaccount of the account, and a third subaccount of the account. The first level of anonymization requests an anonymization of a first piece of identification information associated with the account. In response to receiving the request for the first transaction, the method includes determining, based on the first transaction and the first profile, a set of subaccounts for the first transaction. The set of subaccounts for the first transaction includes the first subaccount and the second subaccount.

Determining the set of subaccounts for the first transaction includes determining that the first profile permits access to the first subaccount, the second subaccount, and the third subaccount. Determining the set of subaccounts for the first transaction also includes determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount. Here, the first transaction cost includes at least one of a foreign currency exchange fee, an excess withdrawal fee, and an interest charge. The method also includes generating a virtual account comprising the set of subaccounts for the first transaction. The method additionally includes anonymizing, based on the first level of anonymization, the virtual account. Anonymizing the virtual account includes applying the anonymization to the first piece of identification information. The method further includes performing the first transaction using the anonymized virtual account.

According to a further embodiment, a system includes a first storage element, a second storage element, and a processing element communicatively coupled to the second storage element. The first storage element is operable to store an account belonging to a first entity. The account includes a first subaccount, a second subaccount, and a third subaccount. The second storage element is operable to store a first profile. The first profile specifies a first level of anonymization and a first level of account access. The first level of account access permits access to the first subaccount, the second subaccount, and the third subaccount. The first level of anonymization requests an anonymization of a name of the first entity. The processing element is operable to receive a request to use the account to complete a first transaction with a second entity. The request is associated with the first profile. In response to receiving the request to use the account to complete the first transaction, the processing element is operable to determine, based on the first transaction and the first profile, a set of subaccounts for the first transaction. The set of subaccounts for the first transaction includes the first subaccount and the second subaccount.

Determining the set of subaccounts for the first transaction includes determining that the first profile permits access to the first subaccount, the second subaccount, and the third subaccounts. Determining the set of subaccounts for the first transaction also includes determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount. Here, the first transaction cost includes at least one of a foreign currency exchange fee, an excess withdrawal fee, and an interest charge. The processing element is also operable to generate a virtual account including the set of subaccounts for the first transaction. The processing element is additionally operable to anonymize, based on the first level of anonymization, the virtual account. Anonymizing the virtual account includes applying the anonymization to the name of the first entity. The processing element is further operable to perform the first transaction using the anonymized virtual account.

Certain embodiments provide one or more technical advantages. For example, an embodiment improves the security of an organization's information when the organization conducts transactions/communications with external entities, by anonymizing certain information associated with the transaction/communication. As another example, an embodiment provides an organization with a customizable level of information anonymization, based on the transaction/communication to be performed and the individual initiating the transaction/communication. As a further example, an embodiment enables an organization to pool together different subaccounts to perform a transaction with an external entity, without providing the external entity information regarding which subaccounts were used to perform the transaction. The system described in the present disclosure may particularly be integrated into a practical application of a data security system for an organization, which may anonymize sensitive information leaving the organization's internal servers through communications and/or transactions with external entities.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

Figure 1:
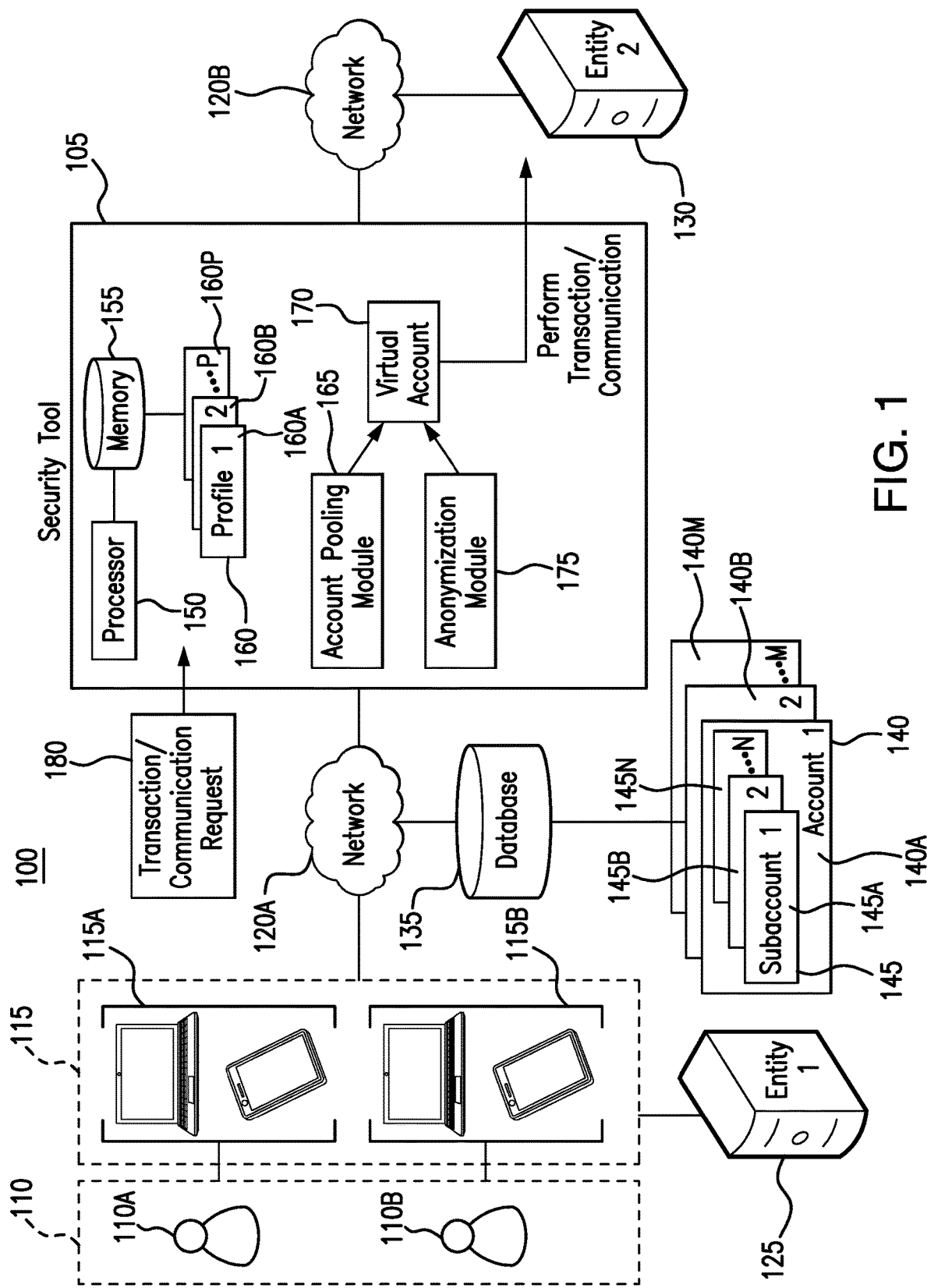
FIG. 1 illustrates an example security tool system.

FIG. 1 illustrates an example system 100 that includes security tool 105, users 110, devices 115, network 120*a*, network 120*b*, first entity 125, second entity 130, set of accounts 140, and set of subaccounts 145. Generally, security tool 105 receives transaction/communication requests 180 from devices 115, seeking to perform a transaction/communication between first entity 125 and second entity 130, and generates an anonymized virtual account 170 to use to perform the transaction/communication.

Devices 115 may be used by users 110 to send transaction/communication requests 180 to security tool 105. This disclosure contemplates that a transaction/communication request 180 may be associated with a profile 160*a*, assigned to user 110*a* who submitted transaction/communication request 180. For example, in certain embodiments, transaction/communication request 180 may include information identifying user 110*a* as having submitted transaction/communication request 180. In certain embodiments, transaction/communication request 180 may include a request to perform a financial transaction. For example, transaction/communication request 180 may include a request for first entity 125 to transfer funds to second entity 130 in exchange for goods and/or services. In some embodiments, transaction/communication request 180 may include a request to send a communication. For example, transaction/communication request 180 may include a request for first entity 125 to send a communication to second entity 130, wherein the communication includes certain information that first entity 125 wishes to share with second entity 130. Additionally, this disclosure contemplates that transaction/communication request 180 may include any request for first entity 125 to exchange any type of data with second entity 130.

Devices 115 include any appropriate device for communicating with components of system 100 over network 120*a*. For example, devices 115 may be a telephone, a mobile phone, a computer, a laptop, a wireless or cellular telephone, a tablet, a server, an IoT device, and/or an automated assistant, among others. This disclosure contemplates devices 115 being any appropriate device for sending and receiving communications over network 120*a*. Device 115 may also include a user interface, such as a display, a microphone, keypad, or other appropriate terminal equipment usable by user 110*a* or 110*b*. In some embodiments, an application executed by a hardware processor of device 115 may perform the functions described herein.

Network 120*a* facilitates communication between and amongst the various components of system 100 located outside of network 120*b*, connecting second entity 130 to security tool 105. This disclosure contemplates network 120*a* being any suitable network that facilitates communication between such components of system 100. Network 120a includes any interconnecting system capable of transmitting audio, video, signals, data, messages, or any combination of the preceding. Network 120a may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 120b facilitates communication between and amongst the various components of security tool 105 and second entity 130. Network 120b is any suitable network that facilitates communication between the components of security tool 105 and second entity 130. Network 120b includes any interconnecting system capable of transmitting audio, video, signals, data, messages, or any combination of the preceding. Network 120b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 120b may be the same network as network 120a or a separate network from network 120a.

First entity 125 represents any computational component belonging to a first organization initiating a transaction or communication with a second organization and connected to security tool 105 through network 120a. For example, first entity 125 may represent processors, storage elements, application servers, database servers, file servers, mail servers, print servers, web servers, or any other type of computation resource belonging to the first organization. This disclosure contemplates that users 110 are authorized to access first entity 125, and to initiate transactions/communications on behalf of the first organization. Similarly, second entity 130 represents any computation component belonging to a second organization receiving the transaction or communication from the first organization and connected to security tool 105 through network 120b.

Database 135 stores accounts 140. Each account 140a through 140m may belong to a particular entity. For example, as illustrated in FIG. 1, account 140a belongs to first entity 125. Each account 140 may contain a set of subaccounts 145. For example, account 140a may contain subaccounts 145a through 145n. Account 140a may contain any number of subaccounts 145a through 145n. For example, in certain embodiments, account 140a contains two or more subaccounts 145a through 145n. In other embodiments, account 140a may not contain any subaccounts 145. In certain embodiments, accounts 140 may represent financial accounts, with subaccounts 145 corresponding to particular types of financial accounts. For example, subaccounts 145a through 145n may include checking accounts, savings accounts, foreign current accounts, credit accounts, brokerage accounts, and/or any other types of financial accounts. In some embodiments, accounts 140 may represent communication accounts, with subaccounts 145a through 145n corresponding to particular types of communication accounts. For example, subaccounts 145a through 14n may include e-mail accounts associated with particular individuals belonging to the entity.

As seen in FIG. 1, security tool 105 includes a processor 150 and a memory 155. This disclosure contemplates processor 150 and memory 155 being configured to perform any of the functions of security tool 105 described herein. Generally, security tool 105 implements account pooling module 165, to pool together a subset of subaccounts 145 in an optimal way and to generate virtual account 170 from the subset of subaccounts 145, implements anonymization module 175 to anonymize information associated with virtual account 170, and performs a transaction with/sends a communication to second entity 130 using the anonymized virtual account 170. These functions of security tool 105 are described in further detail below, in the discussion of FIG. 2.

Processor 150 is any electronic circuitry, including, but not limited to microprocessors, application specific integrated circuits (ASIC), application specific instruction set processor (ASIP), and/or state machines, that communicatively couples to memory 155 and controls the operation of security tool 105. Processor 150 may be 8-bit, 16-bit, 32-bit, 64-bit or of any other suitable architecture. Processor 150 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 150 may include other hardware and software that operates to control and process information. Processor 150 executes software stored on memory to perform any of the functions described herein. Processor 150 controls the operation and administration of security tool 105 by processing information received from network 120a, network 120b, device(s) 115, and memory 155. Processor 150 may be a programmable logic device, a microcontroller, a microprocessor, any suitable processing device, or any suitable combination of the preceding. Processor 150 is not limited to a single processing device and may encompass multiple processing devices.

Memory 155 may store, either permanently or temporarily, data, operational software, or other information for processor 150. Memory 155 may include any one or a combination of volatile or non-volatile local or remote devices suitable for storing information. For example, memory 155 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 155, a disk, a CD, or a flash drive. In particular embodiments, the software may include an application executable by processor 150 to perform one or more of the functions described herein.

Additionally, in certain embodiments, memory 155 is configured to store a set of profiles 160a through 160p. Each of profiles 160a through 160p is associated with a user 110. In certain embodiments, profile 160a, associated with user 110a specifies a level of account access provided to user 110a. For example, profile 160a may indicate that user 110a is permitted to access subaccounts 145a and 145b, but not 145c through 145n. In certain embodiments, profile 160a specifies a level of anonymization associated with user 110a.

This disclosure contemplates that each level of anonymization is associated with an anonymization of certain information associated with account 140a. This disclosure contemplates that the information may include any information that entity 125 may wish to hide from other organizations. For example, in the context of transactions, the information may include the name of entity 125, the billing address of entity 125, or any other sensitive information. In the context of communications, the information may include trade secret information or other confidential information. The levels of anonymization may be cumulative—for example, a first level of anonymization may be associated with anonymizing a first piece of information associated with account 140a, and a second level of anonymization may be associated with anonymizing the first piece of information and a second piece of information associated with account 140a—or independent from one another. Any number of levels of anonymization may exist in system 100. The methods by which security tool 105 may anonymize information based on a specified level of anonymization will be described in further detail below, in the discussion of FIG. 2.

Modifications, additions, or omissions may be made to the systems described herein without departing from the scope of the invention. For example, system 100 may include any number of users 110, devices 115, networks 120, databases 125, first entities 125, and second entities 130. The components may be integrated or separated. Moreover, the operations may be performed by more, fewer, or other components. Additionally, the operations may be performed using any suitable logic comprising software, hardware, and/or other logic.

Figure 2:
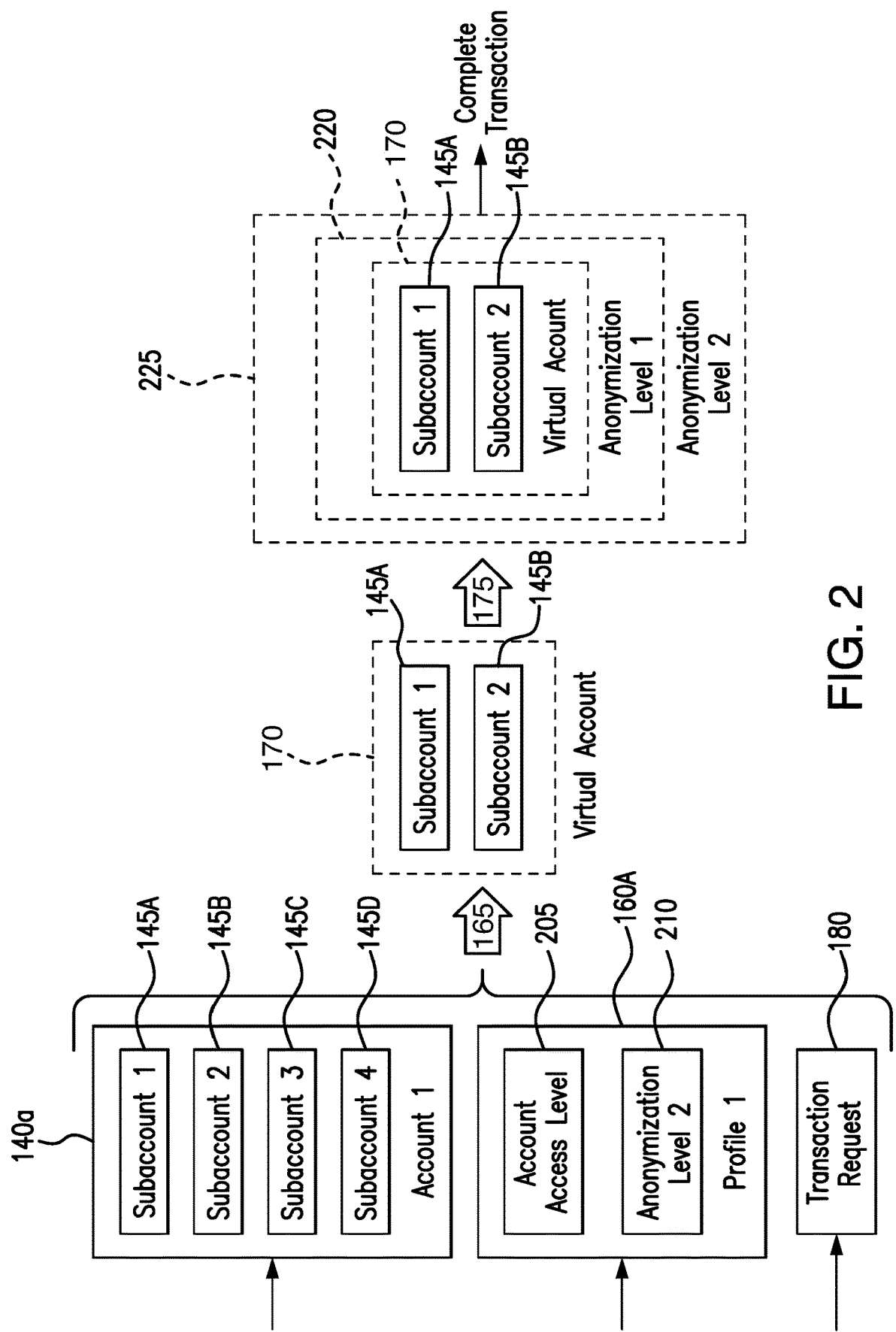
FIG. 2 illustrates an example of pooling together subaccounts, forming a virtual account, and anonymizing the virtual account to complete a transaction.

FIG. 2 presents an example illustrating the account pooling and anonymization functions of security tool 105. As illustrated in FIG. 2, account 140a, belonging to first entity 125, may include a set of four subaccounts—first subaccount 145a, second subaccount 145b, third subaccount 145c, and fourth subaccount 145d. In one embodiment, each subaccount 145 corresponds to a different financial account. For example, first subaccount 145a may correspond to a foreign currency account, second subaccount 145b may correspond to a savings account, third subaccount 145c may correspond to a credit account, and fourth subaccount 145d may correspond to a checking account.

As illustrated in FIG. 2, security tool 105 may receive a transaction/communication request 180 corresponding to a transaction request for first entity 125 to transfer a set amount of funds (i.e., the price of the transaction) to second entity 130. Transaction request 180 is received from device 115a, belonging to user 110a. Accordingly, transaction request 180 may be associated with first profile 160a, assigned to user 110a. As described above, in the discussion of FIG. 1, first profile 160a may indicate an account access level 205. Account access level 205 may indicate to which subaccounts 145a through 145d user 110a is permitted access. For example, account access level 205 may indicate that user 110a is permitted access to first subaccount 145a, second subaccount 145b, and third subaccount 145c, but not to fourth subaccount 145d. In certain embodiments, account access level 205 may also indicate a limit for one or more of the subaccounts to which user 110a is permitted access. For example, account access level 205 may indicate that user 110a is not permitted to access more than $100,000 in funds from first subaccount 145a; $50,000 in funds from second subaccount 145b; $150,000 in funds from third subaccount 145c; and $500,000 in funds from fourth subaccount 145d. Additionally, in certain embodiments, account access level 205 may depend on the type of transaction to be performed and/or the entity 130 to which funds are to be transferred. For example, account access level 205 may indicate that user 110a is permitted access to first subaccount 145a, second subaccount 145b, third subaccount 145c, and fourth subaccount 145d when performing transactions with entity A, but is not permitted to access fourth subaccount 145d when performing transactions with entity B.

First profile 160a may also indicate an anonymization level 210. Anonymization level 210 may indicate a level of anonymization that security tool 105 is to perform on virtual account 170 prior to performing any transactions/communications. For example, as illustrated in FIG. 2, anonymization level 210 may indicate that security tool 105 is to perform a second level of anonymization on virtual account 170 prior to performing any transactions/communications. Each level of anonymization may be associated with a particular piece of information. For example, a first level of anonymization may be associated with the name of entity 125. As another example, a second level of anonymization may be associated with a billing address of entity 125. Each anonymization level may be cumulative—for example, applying the second level of anonymization may first include applying the first level of anonymization—or independent of the other anonymization levels. Any number of levels of anonymization may be available, with each level of anonymization associated with a piece of information which entity 125 may wish to hide from second entity 130. Additionally, in certain embodiments, anonymization level 210, specified in profile 160a, may depend on the type of transaction to be performed and/or the entity 130 to which funds are to be transferred. For example, if entity 130 is a trusted entity, profile 160a may indicate a low level of anonymization. On the other hand, if entity 130 is not yet trusted, profile 160a may indicate a high level of anonymization.

Account Pooling:

Once security tool 105 has received transaction request 180, account pooling module 165 may select an optimal combination of subaccounts 145a and 145b, based on account access level 205 and the particular transaction to be performed. This disclosure contemplates that the optimal combination of subaccounts 145a and 145b is such that (1) account access level 205 indicates that user 110a is permitted access to each subaccount 145a and 145b of the optimal combination of subaccounts 145a and 145b; and (2) that the transaction cost associated with performing the transaction using the optimal combination of subaccounts 145a and 145b is minimized. Here, the transaction cost associated with performing the transaction may include any costs associated with performing a transaction using a financial account. For example, in certain embodiments, the transaction cost may include excess withdrawal fees, foreign currency exchange fees, interest charges, and/or any other fees that may be associated with performing a transaction.

As an example of the operation of account pooling module 165, account pooling module 165 may first determine that account access level 205 indicates that user 110a is permitted to access first subaccount 145a, second subaccount 145b, and third subaccount 145c, but not fourth subaccount 145d. Accordingly, account pooling module 165 may next determine which combination of subaccounts out of first subaccount 145a, second subaccount 145b, and third subaccount 145c results in the lowest transaction cost, when performing the transaction requested by transaction request 180.

A first example of determining the optimal combination of subaccounts from first subaccount 145a, second subaccount 145b, and third subaccount 145c is as follows. Consider a situation in which first subaccount 145a corresponds to a foreign currency account with the equivalent of $100,000 USD in foreign currency, subject to a currency exchange fee for any conversion from the foreign currency to U.S. dollars. Also consider that second subaccount 145b corresponds to a savings account with $500,000, and third subaccount 145c corresponds to a credit account with an available credit limit of $1,000,000. Here, second subaccount 145b is not subject to any fees, while third subaccount 145c is subject to interest charges. Further, consider that the price of the transaction requested by transaction request 180 is $300,000. Here, account pooling module 165 may determine that second subaccount 145b corresponds to the optimal combination of subaccounts, given that no fee is associated with performing the transaction using second subaccount 145b (because second subaccount 145b is a savings account, with a balance sufficient to cover the transaction price). On the other hand, performing the transaction using any combination of subaccounts that includes first subaccount 145a would include a foreign currency exchange fee, while performing the transaction using any combination of subaccounts that includes third subaccount 145c would include an interest charge.

As a second example, consider the same three subaccounts 145a through 145c, but a requested transaction price of $550,000. Here, account pooling module 165 may determine that foreign currency account 145a and savings account 145b correspond to the optimal combination of subaccounts, as illustrated in FIG. 2. For example, account pooling module 165 may determine that no new funds are expected to be deposited in savings account 145b for the next month and that a month's worth of interest charges on a $50,000 balance from credit account 145c is greater than the foreign currency exchange fee associated with converting $50,000 worth of foreign currency from foreign currency account 145a to USD. On the other hand, account pooling module 165 may instead determine that savings account 145b and credit account 145c correspond to the optimal combination of subaccounts, where a deposit of $100,000 is expected in savings account 145b the day after the transaction, such that $50,000 borrowed from credit account 145c may be paid off within a day, and a day's worth of interest charges on a $50,000 balance from credit account 145c is less than the foreign currency exchange fee associated with converting $50,000 worth of foreign currency from foreign currency account 145a to USD.

As a final example, consider the same three subaccounts 145a through 145c as the examples above and the same transaction price of $300,000 as the first example above, but consider that account access level 205 indicates that user 110a is only permitted access to the equivalent of $50,000 USD in foreign currency from first subaccount 145b, $200,000 from second subaccount 145b, and $75,000 in credit from third subaccount 145c. Here, account pooling module 165 may determine that first subaccount 145a, second subaccount 145b, and third subaccount 145c correspond to the optimal combination of subaccounts, because this is the only combination of subaccounts 145 to which user 110a has access that includes enough funds to which user 110a is permitted access to perform the transaction.

Account pooling module 165 may be a software module stored in memory 155 and executed by processor 150. An example operation of the operation of account pooling module 165 is as follows: (1) receive account access level 205 and transaction request 180, (2) determine, based on account access level 205, the subaccounts 145 to which user 110a is permitted access, (3) determine, based on the transaction price of the transaction requested in transaction request 180, an optimal combination of the subaccounts 145 to which user 110a is permitted access.

As illustrated in FIG. 2, once account pooling module 165 has determined an optimal combination of subaccounts 145—here, illustrated as first subaccount 145a and second subaccount 145b—security tool 105 next forms virtual account 170 from the optimal combination of subaccounts 145. This disclosure contemplates that virtual account 170 may be used in the same manner as a traditional account 140 and/or subaccount 145 to perform transactions. In certain embodiments, the use of virtual account 170 to perform a transaction may obfuscate the source of the funds used to perform the transaction. For example, if first entity performs a transaction with second entity 130 using a virtual account 170 that includes first subaccount 145a and second subaccount 145b, second entity 130 may have no knowledge that the transaction was performed using a combination of first subaccount 145a and second subaccount 145b, rather than a single account.

Anonymization:

Once security tool 105 has formed virtual account 170, security tool 105 next uses anonymization module 175 to apply anonymization level 210, specified in profile 160a to virtual account 170. As described above, this disclosure contemplates that each level of anonymization is associated with an anonymization of certain information associated with account 140a, which entity 125 may wish to hide from other organizations. For example, in the context of transactions, the information may include the name of entity 125, the billing address of entity 125, or any other sensitive information. In the context of communications, the information may include trade secret information or other confidential information.

Applying an anonymization to information associated with virtual account 170 includes performing any technique to obfuscate the information, such that it may not be viewed by second entity 130. For example, in certain embodiments, applying the anonymization includes removing the information to be anonymized from virtual account 170. In some embodiments, applying the anonymization includes replacing the information to be anonymized with a piece of generalized information, not specific to entity 125. For example, anonymizing the name of first entity 125 may include replacing the name with a general name, such as "Company," "Company X," or any other general name. In certain embodiments, applying the anonymization may include applying a mask to the information. For example, anonymizing a billing address of first entity 125 may include replacing portions of the address with a given character. As an example, anonymizing the billing address, "#Street Name, City State, 01234," may include replacing "#Street Name" with the 'x' character—i.e., x xxxxxx xxxx, City State, 01234. In certain embodiments, applying the anonymization may include tokenizing the piece of information. For example, anonymizing an account number may include replacing the account number with a randomly generated token. In certain embodiments in which transaction/communication request 180 includes a request to perform a communication, applying a given level of anonymization to virtual account 170 may include both anonymizing information associated with virtual account 170 as well as anonymizing information to be communicated using virtual account 170. For example, anonymization module 175 may be configured to apply certain levels of anonymization to the contents of communication messages, to help ensure that any proprietary/otherwise confidential information is not communicated to second entity 130.

As illustrated in FIG. 2, applying a given level of anonymization to virtual account 170 creates a given virtual account layer 220 or 225. In one embodiment, performing a transaction using a given virtual account layer 220 or 225 is equivalent to performing a transaction using an account in which the information associated with the anonymization level of the virtual account layer 220 or 225 has been obfuscated. Additionally, each anonymization level may be cumulative, as illustrated in FIG. 2. For example, applying a second level of anonymization 210 may include applying a first level of anonymization to generate a first virtual account layer 220, followed by applying the second level of anonymization 210 to generate a second virtual account layer 225, wherein the information obfuscated by second virtual account layer 225 includes the information obfuscated by first virtual account layer 220.

Anonymization module 175 may be a software module stored in memory 155 and executed by processor 150. An example of the operation of anonymization module 175 is as follows: (1) receive anonymization level 210, (2) set a counting variable equal to 1, (3) while the counting variable is less than the anonymization level: anonymize information associated with virtual account 175 according to the anonymization level specified by the counting variable to generate a virtual account layer.

Once anonymization module 175 has applied anonymization level 210 to virtual account 170 to form virtual account layer 225, security tool 105 uses virtual account layer 225 to perform the transaction.

While illustrated in FIG. 2 as account 140a including a set of four subaccounts 145a through 145d, this disclosure contemplates that account 140a may include any number of subaccounts 145. Additionally, while illustrated in FIG. 2 as virtual account 170 including a pair of subaccounts 145a and 145b, virtual account 170 may include any number of subaccounts 145. For example, in certain embodiments in which transaction/communication request 180 corresponds to a communication request, virtual account 170 may include a single subaccount 145a, associated with an email account to which user 110a is permitted access. In such embodiments, generating virtual account 170 may then include generating a virtual email account from the email account to which user 110a is permitted access.

Figure 3:
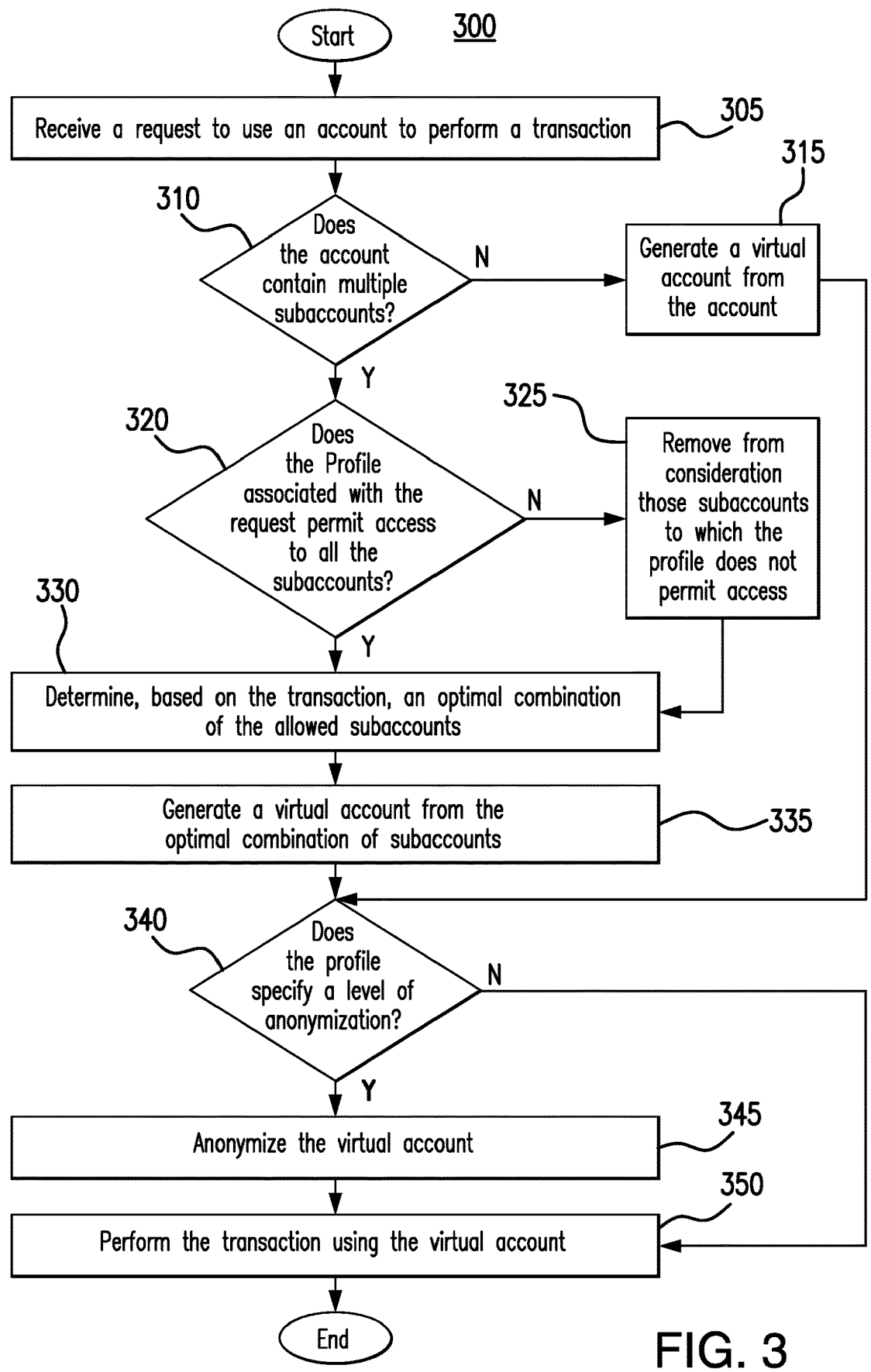
FIG. 3 presents a flowchart illustrating the process by which the security tool of the system of FIG. 1 performs a transaction using a specified level of anonymization.

FIG. 3 presents a flowchart illustrating the process by which security tool 105 performs a transaction using a specified level of anonymization. In step 305, security tool 105 receives request 180 from user 110a to use account 140a to perform a transaction. In step 310, security tool 105 determines whether account 140a contains multiple subaccounts 145. If, in step 310, security tool 105 determines that account 140a does not contain multiple subaccounts 145, in step 315, security tool 105 generates virtual account 170 from account 140a, and proceeds to step 340. On the other hand, if, in step 310, security tool 105 determines that account 140a does contain multiple subaccounts 145, security tool 105 next determines, in step 320, whether profile 160a, associated with request 180, permits access to all of the subaccounts 145a through 145n or only a subset of subaccounts 145a through 145n.

If, in step 320, security tool 105 determines that profile 160a does not permit access to all of subaccounts 145a through 145n, then, in step 325, security tool 105 removes from consideration those subaccounts to which profile 160a does not permit access. For example, if profile 160a indicates that user 110a is permitted access to first subaccount 145a, second subaccount 145b, and third subaccount 145c, but not to the remaining subaccounts 145d through 145n, security tool 105 removes subaccounts 145d through 145n from consideration. Here, removing subaccounts 145d through 145n from consideration means that security tool 150 will not use any of subaccounts 145d through 145n in determining an optimal combination of subaccounts with which to perform the transaction, as described below, in step 330.

After removing from consideration those subaccounts to which profile 160a does not permit access, security tool 105 next determines, based on the transaction, an optimal combination of the allowed subaccounts, in step 330. Similarly, if, in step 320, security tool 105 determines that profile 160a permits access to all of subaccounts 145a through 145n, security tool 105 next determines, based on the transaction, an optimal combination of the allowed subaccounts, in step 330, where the allowed subaccounts include all of subaccounts 145a through 145n.

In one embodiment, determining the optimal combination of the allowed subaccounts includes determining a combination of allowed subaccounts 145 which, when used to perform the transaction, lead to minimum transaction costs, as compared with any of the other possible combinations. Here, the transaction cost associated with performing the transaction may include any costs associated with performing a transaction using a financial account. For example, in certain embodiments, the transaction cost may include excess withdrawal fees, foreign currency exchange fees, interest charges, and/or any other fees that may be associated with performing a transaction. Examples illustrating the process of determining the optimal combination of allowed subaccounts are presented above, in the discussion of FIG. 2.

In step 335, security tool 105 generates virtual account 170 from the optimal combination of subaccounts 145a through 145n. In step 340, security tool 105 determines whether profile 160a specifies a level of anonymization to apply to virtual account 170. If, in step 340, security tool 105 determines that profile 160a does not specify a level of anonymization to apply to virtual account 170, security tool 105 proceeds to step 350. On the other hand, if, in step 340, security tool 105 determines that profile 160a specifies a level of anonymization to apply to virtual account 170, security tool 105 anonymizes virtual account 170, by applying the specified level of anonymization to virtual account 170, in step 345. This disclosure contemplates that applying the specified level of anonymization to virtual account 170 includes performing any technique which obfuscates the information specified by the level of anonymization, such that it may not be viewed by second entity 130, as described in further detail above, in the discussion of FIG. 2. Finally, in step 350, security tool 105 uses virtual account 170 to perform the transaction.

Modifications, additions, or omissions may be made to method 300 depicted in FIG. 3. Method 300 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

Figure 4:
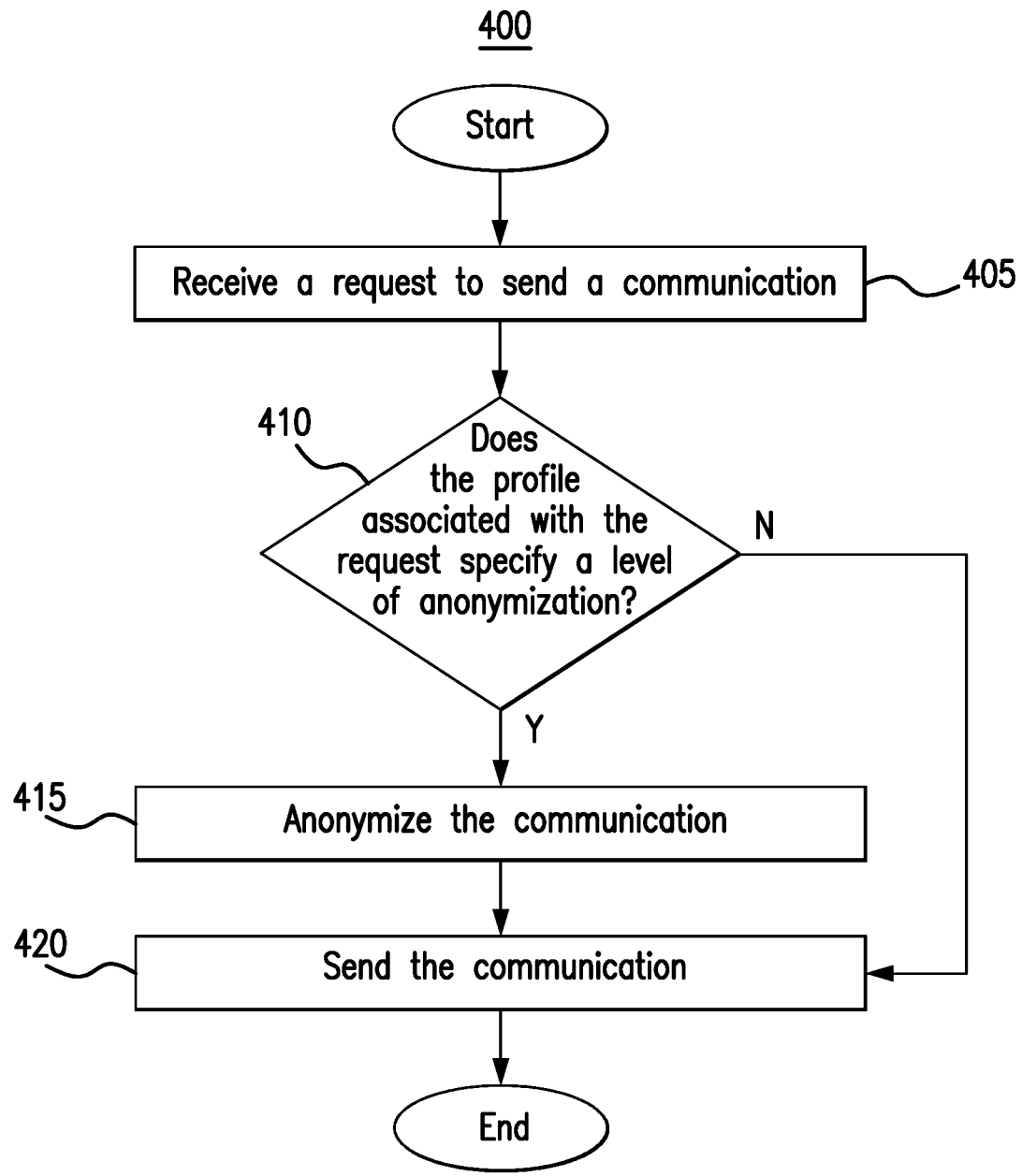
FIG. 4 presents a flowchart illustrating the process by which the security tool of the system of FIG. 1 sends a communication using a specified level of anonymization.

FIG. 4 presents a flowchart illustrating the process by which security tool 105 sends a communication using a specified level of anonymization. In step 405, security tool 105 receives a request 180 to send a communication to second entity 130. In step 410, security tool 105 determines whether profile 160a associated with request 180 specifies a given level of anonymization 210. If, in step 410, security tool 105 determines that profile 160a specifies a given level of anonymization 210, in step 415, security tool 105 anonymizes the communication based on the given level of anonymization 210. Anonymizing the communication may include anonymizing information associated with the account performing the communication and/or anonymizing information included within the communication.

If, in step 410, security tool 105 determines that profile 160a associated with request 180 does not specify a given level of anonymization 210, security tool 105 proceeds to step 420. In step 420, security tool 105 sends the communication.

Modifications, additions, or omissions may be made to method 400 depicted in FIG. 4. Method 400 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
    a database configured to store an account comprising:
        a first subaccount;
        a second subaccount; and
        a third subaccount;
    a memory configured to store:
        a first profile, the first profile specifying a first level of anonymization and a first level of account access, the first level of account access permitting access to the first subaccount, the second subaccount, and the third subaccount, the first level of anonymization requesting an anonymization of a first piece of identification information associated with the account; and
        a second profile, the second profile specifying a second level of anonymization and a second level of account access, the second level of account access permitting access to the first subaccount and denying access to the second subaccount and the third subaccount, the second level of anonymization requesting the anonymization of the first piece of identification information associated with the account and an anonymization of a second piece of identification information associated with the account;
    a hardware processor communicatively coupled to the memory, the hardware processor configured to:
        receive, over an internal network and from a first device located on the internal network, a request for a first transaction using the account wherein:
            the first transaction is between the first entity and a second entity, the first entity located on the internal network, the second entity located on an external network; and
            the request is associated with the first profile;
        in response to receiving the request for the first transaction:
            determine, based on the first transaction and the first profile, a set of subaccounts for the first transaction, the set of subaccounts for the first transaction comprising the first subaccount and the second subaccount, wherein determining the set of subaccounts for the first transaction comprises:
                determining that the first profile permits access to the first subaccount, the second subaccount, and the third subaccount; and
                determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount, wherein the first transaction cost comprises at least one of a foreign currency exchange fee, an excess withdrawal fee, and an interest charge;
            generate a virtual account comprising the set of subaccounts for the first transaction;
            anonymize, based on the first level of anonymization, the virtual account, wherein anonymizing the virtual account comprises applying the anonymization to the first piece of identification information;
            perform the first transaction using the anonymized virtual account, wherein the second piece of identification information and the anonymized first piece of identification information are transmitted to the second entity over the external network during the first transaction, and the first piece of identification information is not transmitted over the external network during the first transaction, such that the first piece of identification information is hidden from the second entity during the first transaction;
        receive, over the internal network and from a second device located on the internal network, a request for a second transaction using the account, wherein the request is associated with the second profile; and
        in response to receiving the request for the second transaction:
            determine that the second profile permits access to the first subaccount and denies access to the second subaccount and the third subaccount;
            in response to determining that the second profile permits access to the first subaccount and denies access to the second subaccount and the third subaccount, generate a second virtual account comprising the first subaccount;
            anonymize, based on the second level of anonymization, the second virtual account, wherein anonymizing the second virtual account comprises applying the anonymization of the first piece of identification information to the first piece of identification information and applying the anonymization of the second piece of identification information to the second piece of identification information; and
            perform the second transaction using the anonymized second virtual account, wherein the anonymized second piece of identification information and the anonymized first piece of identification information are transmitted to the second entity over the external network during the second transaction, and the first piece of identification information and the second piece of identification information are not transmitted over the external network during the second transaction.

2. The system of claim 1, wherein:
the memory is further configured to store a third profile, the third profile specifying the second level of anonymization and a third level of account access, the third level of account access permitting access to the first subaccount and the second subaccount; and
the processor is further configured to:
  receive a request for a third transaction, the request for the third transaction associated with the third profile;
  in response to receiving the request for the third transaction:
    determine, based on the third transaction and the third profile, a set of subaccounts for the third transaction, the set of subaccounts for the third transaction comprising the first subaccount, wherein determining the set of subaccounts for the third transaction comprises:
      determining that the third profile permits access to the first subaccount and the second subaccount; and
      determining that a fourth transaction cost associated with performing the third transaction using the first subaccount is lower than a fifth transaction cost associated with performing the third transaction using the second subaccount and a sixth transaction cost associated with performing the third transaction using a fourth combination of the first subaccount and the second subaccount;
    generate a third virtual account comprising the set of subaccounts for the third transaction;
    anonymize, based on the second level of anonymization, the third virtual account, wherein anonymizing the third virtual account comprises applying the anonymization of the first piece of identification information to the first piece of identification information and applying the anonymization of the second piece of identification information to the second piece of identification information; and
    perform the third transaction using the third anonymized virtual account.

3. The system of claim 1, wherein:
the first piece of identification information comprises a name of the first entity.

4. The system of claim 1, wherein:
a price is assigned to the first transaction; and
determining the set of subaccounts for the first transaction further comprises:
  determining that funds in the first subaccount are less than the price;
  funds in the second subaccount are less than the price;
  funds in the third subaccount are less than the price; and
  the funds in the first subaccount combined with the funds in the second subaccount are greater than the price.

5. The system of claim 1, wherein applying the anonymization to the first piece of identification information comprises at least one of removing the first piece of identification information, replacing the first piece of identification information with generalized information, applying a mask to the first piece of identification information, and tokenizing the first piece of identification information.

6. The system of claim 1, wherein the processor is further configured to:
receive a request to send a communication, the request to send the communication associated with the first profile, the communication comprising the first piece of identification information associated with the account;
in response to receiving the request to send the communication:
  anonymize, based on the first level of anonymization, the communication, wherein anonymizing the communication comprises applying the anonymization to the first piece of identification information; and
  send the anonymized communication.

7. The system of claim 1, wherein:
the first profile further specifies a first limit for the first subaccount, a second limit for the second subaccount, and a third limit for the third subaccount; and
determining the set of subaccounts for the first transaction further comprises determining that the first transaction can be performed using the first combination of the first subaccount and the second subaccount without exceeding the first limit for the first subaccount and the second limit for the second subaccount.

8. A method comprising:
receiving, over an internal network, a request for a first transaction to be performed using an account, the first transaction between a first entity and a second entity, the first entity located on the internal network, the second entity located on an external network, the request associated with a first profile, the first profile specifying a first level of anonymization and a first level of account access, the first level of account access permitting access to a first subaccount of the account, a second subaccount of the account, and a third subaccount of the account, the first level of anonymization requesting an anonymization of a first piece of identification information associated with the account;
in response to receiving the request for the first transaction:
  determining, based on the first transaction and the first profile, a set of subaccounts for the first transaction, the set of subaccounts for the first transaction comprising the first subaccount and the second subaccount, wherein determining the set of subaccounts for the first transaction comprises:
    determining that the first profile permits access to the first subaccount, the second subaccount, and the third subaccount; and
    determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount, wherein the first transaction cost comprises at least one of a foreign currency exchange fee, an excess withdrawal fee, and an interest charge;
  generating a virtual account comprising the set of subaccounts for the first transaction;
  anonymizing, based on the first level of anonymization, the virtual account, wherein anonymizing the virtual account comprises applying the anonymization to the first piece of identification information;

performing the first transaction using the anonymized virtual account, wherein the second piece of identification information and the anonymized first piece of identification information are transmitted to the second entity over the external network during the first transaction, and the first piece of identification information is not transmitted over the external network during the first transaction, such that the first piece of identification information is hidden from the second entity during the first transaction;

receiving, over the internal network, a request for a second transaction using the account, the request associated with a second profile, the second profile specifying a second level of anonymization and a second level of account access, the second level of account access permitting access to the first subaccount and denying access to the second subaccount and the third subaccount, the second level of anonymization requesting the anonymization of the first piece of identification information and an anonymization of a second piece of identification information associated with the account; and in response to receiving the request for the second transaction:
  determining that the second profile permits access to the first subaccount and denies access to the second subaccount and the third subaccount;
  in response to determining that the second profile permits access to the first subaccount and denies access to the second subaccount and the third subaccount, generating a second virtual account comprising the first subaccount;
  anonymizing, based on the second level of anonymization, the second virtual account, wherein anonymizing the second virtual account comprises applying the anonymization of the first piece of identification information to the first piece of identification and applying the anonymization of the second piece of identification information to the second piece of identification information; and
  performing the second transaction using the anonymized second virtual account, wherein the anonymized second piece of identification information and the anonymized first piece of identification information are transmitted to the second entity over the external network during the second transaction, and the first piece of identification information and the second piece of identification information are not transmitted over the external network during the second transaction.

9. The method of claim 8, further comprising:
receiving a request for a third transaction to be performed using the account, the request for the third transaction associated with a third profile, the third profile specifying the second level of anonymization and a third level of account access, the third level of account access permitting access to the first subaccount and the second subaccount and denying access to the third subaccount;
in response to receiving the request for the third transaction:
  determining, based on the third transaction and the third profile, a set of subaccounts for the third transaction, the set of subaccounts for the third transaction comprising the first subaccount, wherein determining the set of subaccounts for the third transaction comprises:
    determining that the third profile permits access to the first subaccount and the second subaccount; and
    determining that a fourth transaction cost associated with performing the third transaction using the first subaccount is lower than a fifth transaction cost associated with performing the third transaction using the second subaccount and a sixth transaction cost associated with performing the third transaction using a fourth combination of the first subaccount and the second subaccount;
  generating a third virtual account comprising the set of subaccounts for the third transaction;
  anonymizing, based on the second level of anonymization, the third virtual account, wherein anonymizing the third virtual account comprises applying the anonymization of the first piece of identification information to the first piece of identification information and applying the anonymization of the second piece of identification information to the second piece of identification information; and
  performing the third transaction using the third anonymized virtual account.

10. The method of claim 8, wherein:
the first piece of identification information comprises a name of the first entity.

11. The method of claim 8, wherein:
a price is assigned to the first transaction; and
determining the set of subaccounts for the first transaction further comprises:
  determining that funds in the first subaccount are less than the price;
  funds in the second subaccount are less than the price;
  funds in the third subaccount are less than the price; and
  the funds in the first subaccount combined with the funds in the second subaccount are greater than the price.

12. The method of claim 8, wherein applying the anonymization to the first piece of identification information comprises at least one of removing the first piece of identification information, replacing the first piece of identification information with generalized information, applying a mask to the first piece of identification information, and tokenizing the first piece of identification information.

13. The method of claim 8, further comprising:
receiving a request to send a communication, the request to send the communication associated with the first profile, the communication comprising the first piece of identification information associated with the account;
in response to receiving the request to send the communication:
  anonymizing, based on the first level of anonymization, the communication, wherein anonymizing the communication comprises applying the anonymization to the first piece of identification information; and
  sending the anonymized communication.

14. The method of claim 8, wherein:
the first profile further specifies a first limit for the first subaccount, a second limit for the second subaccount, and a third limit for the third subaccount; and
determining the set of subaccounts for the first transaction further comprises determining that the first transaction can be performed using the first combination of the first subaccount and the second subaccount without exceeding the first limit for the first subaccount and the second limit for the second subaccount.

15. A system comprising:
a first storage element operable to store an account belonging to a first entity, the account comprising:
   a first subaccount;
   a second subaccount; and
   a third subaccount;
a second storage element operable to store:
   a first profile, the first profile specifying a first level of anonymization and a first level of account access, the first level of account access permitting access to the first subaccount, the second subaccount, and the third subaccount, the first level of anonymization requesting an anonymization of a first piece of identification information associated with the account; and
   a second profile, the second profile specifying a second level of anonymization and a second level of account access, the second level of account access permitting access to the first subaccount and denying access to the second subaccount and the third subaccount, the second level of anonymization requesting the anonymization of the first piece of identification information associated with the account and an anonymization of a second piece of identification information associated with the account;
a processing element communicatively coupled to the second storage element, the processing element operable to:
   receive, over an internal network and from a first device located on the internal network, a request to use the account to complete a first transaction with a second entity, wherein:
      the first entity is located on the internal network, and the second entity is located on an external network; and
      the request is associated with the first profile;
   in response to receiving the request to use the account to complete the first transaction:
      determine, based on the first transaction and the first profile, a set of subaccounts for the first transaction, the set of subaccounts for the first transaction comprising the first subaccount and the second subaccount, wherein determining the set of subaccounts for the first transaction comprises:
         determining that the first profile permits access to the first subaccount, the second subaccount, and the third subaccount; and
         determining that a first transaction cost associated with performing the first transaction using a first combination of the first subaccount and the second subaccount is lower than a second transaction cost associated with performing the first transaction using a second combination of the first subaccount and the third subaccount and a third transaction cost associated with performing the first transaction using a third combination of the second subaccount and the third subaccount, wherein the first transaction cost comprises at least one of a foreign currency exchange fee, an excess withdrawal fee, and an interest charge;
      generate a virtual account comprising the set of subaccounts for the first transaction;
      anonymize, based on the first level of anonymization, the virtual account, wherein anonymizing the virtual account comprises applying the anonymization to the name of the first entity;
      perform the first transaction using the anonymized virtual account, wherein the second piece of identification information and the anonymized first piece of identification information are transmitted to the second entity over the external network during the first transaction, and the first piece of identification information is not transmitted over the external network during the first transaction, such that the first piece of identification information is hidden from the second entity during the first transaction;
   receive, over the internal network and from a second device located on the internal network, a request to use the account to complete a second transaction, wherein the request is associated with the second profile;
   in response to receiving the request for the second transaction:
      determine that the second profile permits access to the first subaccount and denies access to the second subaccount and the third subaccount;
      in response to determining that the second profile permits access to the first subaccount and denies access to the second subaccount and the third subaccount, generate a second virtual account comprising the first subaccount;
      anonymize, based on the second level of anonymization, the second virtual account, wherein anonymizing the second virtual account comprises applying the anonymization of the first piece of identification information to the first piece of identification information and applying the anonymization of the second piece of identification information to the second piece of identification information; and
      perform the second transaction using the anonymized second virtual account, wherein the anonymized second piece of identification information and the anonymized first piece of identification information are transmitted to the second entity over the external network during the second transaction, and the first piece of identification information and the second piece of identification information are not transmitted over the external network during the second transaction.

16. The system of claim 15, wherein:
the second storage element is further operable to store a third profile, the third profile specifying the second level of anonymization and a third level of account access, the third level of account access permitting access to the first subaccount and the second subaccount; and
the processing element is further operable to:
   receive a request to use the account to complete a third transaction, the request for the third transaction associated with the third profile;
   in response to receiving the request to use the account to complete the third transaction:
      determine, based on the third transaction and the third profile, a set of subaccounts for the third transaction, the set of subaccounts for the third transaction comprising the first subaccount, wherein determining the set of subaccounts for the third transaction comprises:

determining that the third profile permits access to the first subaccount and the second subaccount; and determining that a fourth transaction cost associated with performing the third transaction using the first subaccount is lower than a fifth transaction cost associated with performing the third transaction using the second subaccount and a sixth transaction cost associated with performing the third transaction using a fourth combination of the first subaccount and the second subaccount;

generate a third virtual account comprising the set of subaccounts for the third transaction;

anonymize, based on the second level of anonymization, the third virtual account, wherein anonymizing the third virtual account comprises applying the anonymization of the first piece of identification information to the first piece of identification information and applying the anonymization of the second piece of identification information to the second piece of identification information; and perform the third transaction using the third anonymized virtual account.

17. The system of claim 15, wherein:

a price is assigned to the first transaction; and determining the set of subaccounts for the first transaction further comprises:

determining that funds in the first subaccount are less than the price;

funds in the second subaccount are less than the price;

funds in the third subaccount are less than the price; and the funds in the first subaccount combined with the funds in the second subaccount are greater than the price.

18. The system of claim 15, wherein applying the anonymization to the first piece of identification information comprises at least one of removing the first piece of identification information, replacing the first piece of identification information with generalized information, applying a mask to the first piece of identification information, and tokenizing the first piece of identification information.

19. The system of claim 15, wherein the processing element is further operable to:

receive a request to send a communication, the request to send the communication associated with the first profile, the communication comprising the first piece of identification information associated with the account;

in response to receiving the request to send the communication:

anonymize, based on the first level of anonymization, the communication, wherein anonymizing the communication comprises applying the anonymization to the name of the first entity; and send the anonymized communication.

20. The system of claim 15, wherein:

the first profile further specifies a first limit for the first subaccount, a second limit for the second subaccount, and a third limit for the third subaccount; and determining the set of subaccounts for the first transaction further comprises determining that the first transaction can be performed using the first combination of the first subaccount and the second subaccount without exceeding the first limit for the first subaccount and the second limit for the second subaccount.

* * * * *